US006029335A

United States Patent [19]

Hui et al.

[11] Patent Number: 6,029,335

[45] Date of Patent: Feb. 29, 2000

[54] METHOD AND TOOL FOR ALIGNING A STRIKER WITH A LATCH

[75] Inventors: Anna Hui, Rochester Hills; Robert A. Navaroli, Clinton Township; Jeffrey M. Niemi, Milford; Donald J. Ford, Wayne, all of Mich.

[73] Assignee: Chrysler Corporation, Auburn Hills, Mich.

[21] Appl. No.: 09/148,586

[22] Filed: Sep. 4, 1998

[51] Int. Cl.[7] .............................. B23Q 3/00; B25B 27/14

[52] U.S. Cl. .............................. 29/464; 29/271

[58] Field of Search .............................. 29/464, 468, 271, 29/281.1, 281.4, 281.5; 269/21, 16, 287, 37, 40, 905

[56] References Cited

U.S. PATENT DOCUMENTS 4,989,313 2/1991 Dzurko et al. .............................. 29/281.4
5,282,305 2/1994 Nutt et al. .............................. 29/468
5,653,012 8/1997 Pasternak et al. .
5,694,675 12/1997 Pasternak et al. .

OTHER PUBLICATIONS

Co–pending U.S. application No. 09/083,991, filed May 22, 1998.

Co–pending U.S. application No. 08/924,363, filed Sep. 5, 1997.

*Primary Examiner*—David P. Bryant
*Attorney, Agent, or Firm*—James R. Yee

[57] ABSTRACT

A tool for aligning a striker with a latch for a door on a motor vehicle includes a base member and a striker setter positioned perpendicular to an end of the base member. The tool also includes a suction cup for holding the tool onto the vehicle, and a latch setter extending outwardly from an end of the base member. The alignment tool further includes a striker lead-in at one end of the striker setter for positioning the striker relative to the latch.

12 Claims, 5 Drawing Sheets

METHOD AND TOOL FOR ALIGNING A STRIKER WITH A LATCH

BACKGROUND OF THE INVENTION

1. Field of the Invention

The present invention relates generally to doors for motor vehicles and, more particularly, to a method and tool for aligning a striker with a latch for a door on a motor vehicle.

2. Discussion

A motor vehicle may include a closure panel such as a door, a hood, or a liftgate. Typically, the closure panel includes a latch that engages a striker positioned on the vehicle body of the motor vehicle. For example, to retain the door in a closed position, the door includes a latch that engages the striker, which is mounted on the door frame of the vehicle body. A liftgate on a truck or sport utility vehicle includes a latch that similarly engages a striker mounted on a liftgate frame of the vehicle body for holding the liftgate in a closed position. A hood also includes a latch for engaging with a striker positioned on the vehicle body of the motor vehicle to retain the hood in a closed position.

Motor vehicle manufacturers, in response to market competitiveness, are continuously attempting to improve their vehicles in areas such as vehicle fit and finish and quietness. For example, the fit of a door to a body panel, the effort to close the door, and the quietness of the door can all be enhanced by more precise alignment of the door latch and striker. The door latch and striker alignment is determined during the vehicle assembly process. During the vehicle assembly process, the vehicle typically is painted in one step. In a subsequent step, the vehicle door is removed to protect the paint finish of the door while the vehicle is being assembled. In still another subsequent step, after the vehicle is nearly complete, the door is reinstalled on the vehicle. In a further subsequent step, an assembler, using a trial and error process, initially positions the striker, so that the striker is engaged by the door latch when the door is closed. The assembler tightens a retaining fastener for the striker, and shuts the door. If the door is difficult to close, or the door is not flush with the vehicle body panel, the assembler continues to adjust the position of the striker and test the door, until the striker alignment is improved, in an iterative, trail and error methodology.

Since it is desired that the dimensional relationship between the striker and latch be strictly maintained to minimize door closing efforts and door related noises, this trial and error methodology is time-consuming and inaccurate. Thus, there is a need in the art for improving alignment of a door striker with a latch.

Another method and apparatus for aligning a striker with a latch is disclosed in U.S. patent application Ser. No. 08/924,363 titled "Method and Tool for Aligning a Striker with a Latch" filed Sep. 5, 1997 and also assigned to Chrysler Corporation, and this application is hereby incorporated by reference. A further related application for aligning a striker with a latch is disclosed in U.S. patent application Ser. No. 09/083,991, entitled "Setting Fixture", filed May 22, 1998 and also assigned to Chrysler Corporation, and this application is hereby incorporated by reference.

SUMMARY OF THE INVENTION

It is, therefore, one objective of the present invention to provide a method for aligning a striker with a latch on a motor vehicle.

It is another objective of the present invention to provide a tool for aligning a door striker with a latch on a motor vehicle.

It is yet another objective of the present invention to provide a tool that positively aligns a door stiker with a door latch on a motor vehicle.

It is still another objective of the present invention to provide a method for using the tool to align a door striker with the door latch on a motor vehicle.

To achieve the foregoing objective, the present invention is a method and tool for aligning a striker with a latch for a door on a motor vehicle.

One advantage of the present invention is that the tool accurately positions a door striker relative to the latch, independent of the relative orientation of the door. Another advantage of the present invention is that the improved fit of the door to the vehicle body minimizes door closing effort and rattling of the latch and striker. Yet another advantage of the present invention is that a method for using the tool is provided that initially positions the striker to avoid a trial and error procedure.

Other objectives, features and advantages of the present invention will be readily appreciated as the same becomes better understood after reading the subsequent description taken in connection with the accompanying drawings.

DETAILED DESCRIPTION OF THE INVENTION

Figure 1:
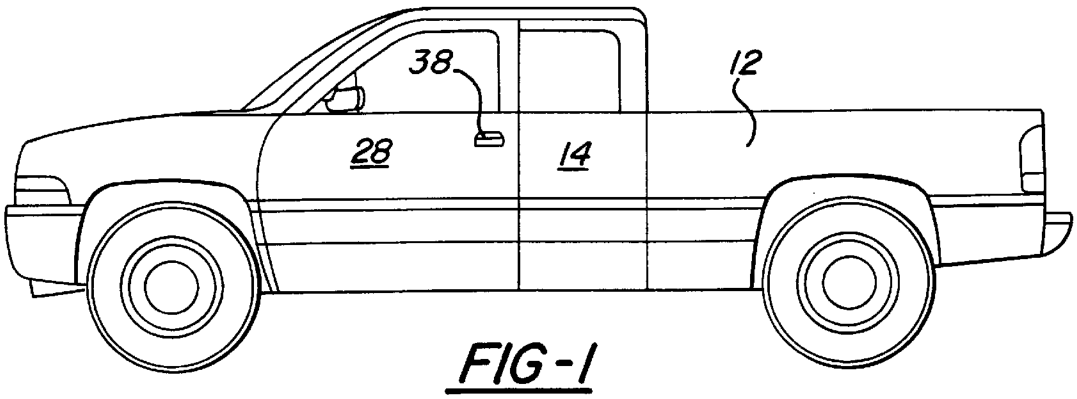
FIG. 1 is an elevational view of a motor vehicle with which the method and apparatus of the present invention may be used.

Referring to FIG. 1, one embodiment of a motor vehicle 12, such as a truck in this example, is illustrated. The motor vehicle 12 includes a vehicle body 14 formed from a plurality of panels which generally define the structural shape of the vehicle 12. The vehicle body 14 includes at least one closure panel portion, such as a door 28, a hood (not shown), or a liftgate (not shown).

The door 28 encloses a door opening 18 (FIG. 2), as is well known in the art. The door opening 18 is generally defined by a first side 20, a top side 22, a second side 24 and a bottom side 26. The first side 20 extends vertically. The top side 22 is adjacent to the first side 20. The second side 24 is adjacent to the top side 22 and opposite the first side 20. The bottom side 26 is between the first side 20 and the second side 24, and opposite the top side 22. The door 28 is pivotedly mounted to the first side 20 by suitable means such as hinges (not shown) as is known in the art. The door 28, in a closed position, is retained to the second side 24, in a manner to be described, such that in a closed position the door 28 and vehicle body 14 form a relatively generally planar surface.

Figure 2:
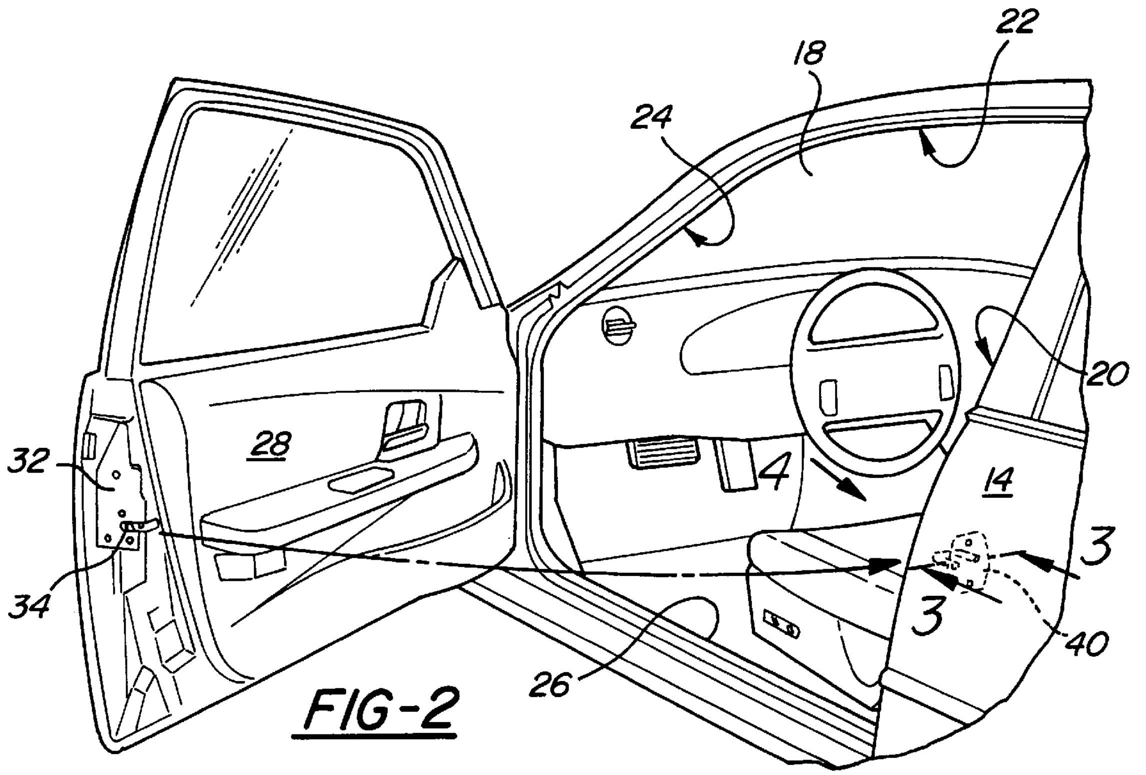
FIG. 2 is a perspective view of a portion of the motor vehicle of FIG. 1 illustrating a door striker and latch with which the method and apparatus of the present invention may be used.
Figure 3:
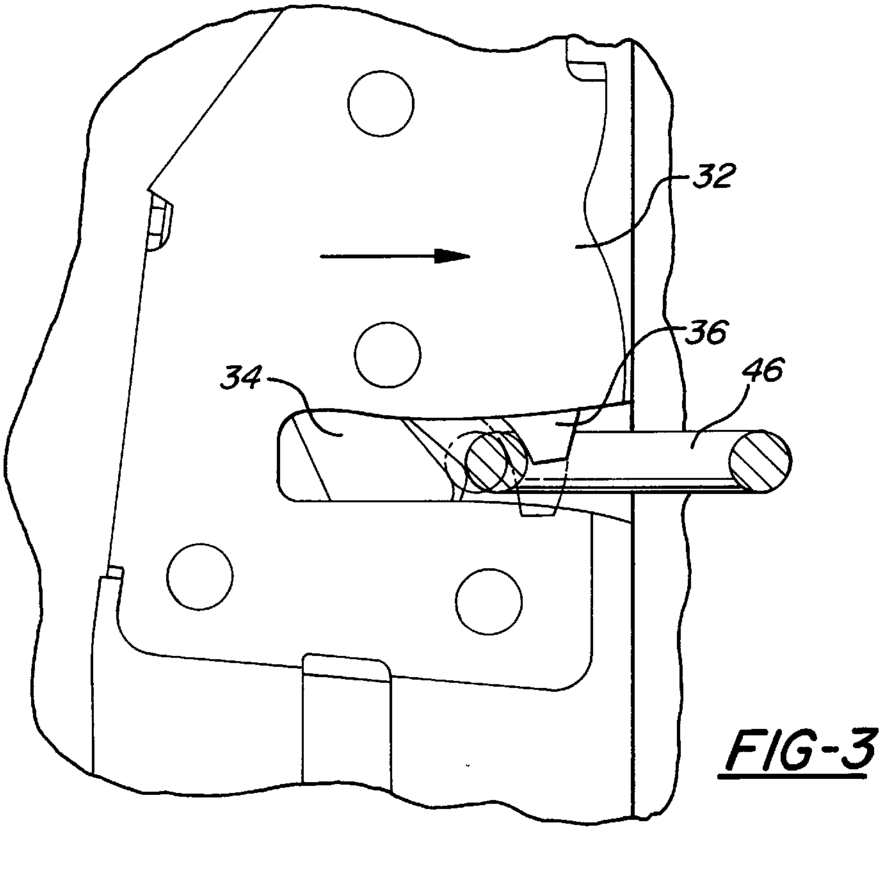
FIG. 3 is an enlarged view of the door striker and latch of FIG. 2.

Referring to FIGS. 2 and 3, the door 28 includes a latch 32 for maintaining the door 28 in a closed position. The latch 32, as is well known in the art, includes a striker retaining portion 34, defining a generally U-shaped opening. The latch 32 also includes a hooking mechanism 36 within the striker retaining portion 34. The hooking mechanism 36 is operably connected to a door handle 38 positioned on the door 28, as illustrated in FIG. 1.

Figure 4:
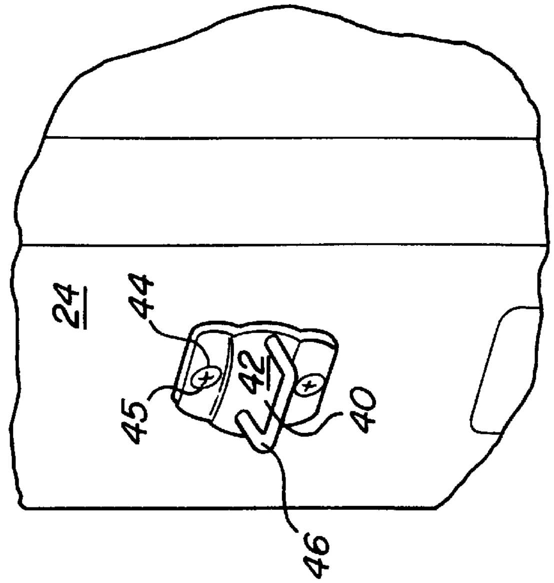
FIG. 4 is a perspective view of the door striker for the motor vehicle of FIGS. 1–3 with which the method and apparatus of the present invention may be used.

The vehicle body 14 includes a striker 40 mounted to the second side 24 (see FIG. 4). The striker 40 includes a plate 42 portion having an attachment opening 44 therein for attaching the plate 42 to the second side 24. Preferably there are two attachment openings 44 and the plate 42 is secured to the second side 24 using a fastener such as a screw 45. The striker 40 includes a C-shaped member 46 outwardly extending perpendicular to the plate 42. Preferably, the C-shaped member 46 is circular in cross-sectional shape.

To close the door 28, the door 28 is directed in a closing direction, until the striker's C-shaped member 46 is fixedly engaged within the striker retaining portion 34 by the hooking mechanism 36, as illustrated by the arrow in FIG. 2. To open the door 28, the door handle 38 is moved to disengage the hooking mechanism 36 from the striker's C-shaped member 46, so that the door 28 can pivot in an open direction.

The alignment of the striker retaining portion 34 and the striker 40 influence the operation of the door 28. For example, a noise commonly referred to in the art as "door chucking," occurs as a result of the rattling of the striker's C-shaped member 46 within the striker retaining portion 34. One method for reducing "door chucking" is to decrease the size of the striker retaining portion 34. However, a decreased size of the striker retaining portion 34 requires that the spatial relationship between the striker retaining portion 34 and the striker 40 be tightly controlled, such as to ±0.25 mm. A variation in the installed position of the door 28, such as ±2.5 mm, may alter the alignment between the striker retaining portion 34 and the striker 40. An example of an effect of misalignment between the striker 40 and the striker retaining portion 34 is an increased door 28 closure effort, or a "popping" noise when opening the door 28.

Figure 5:
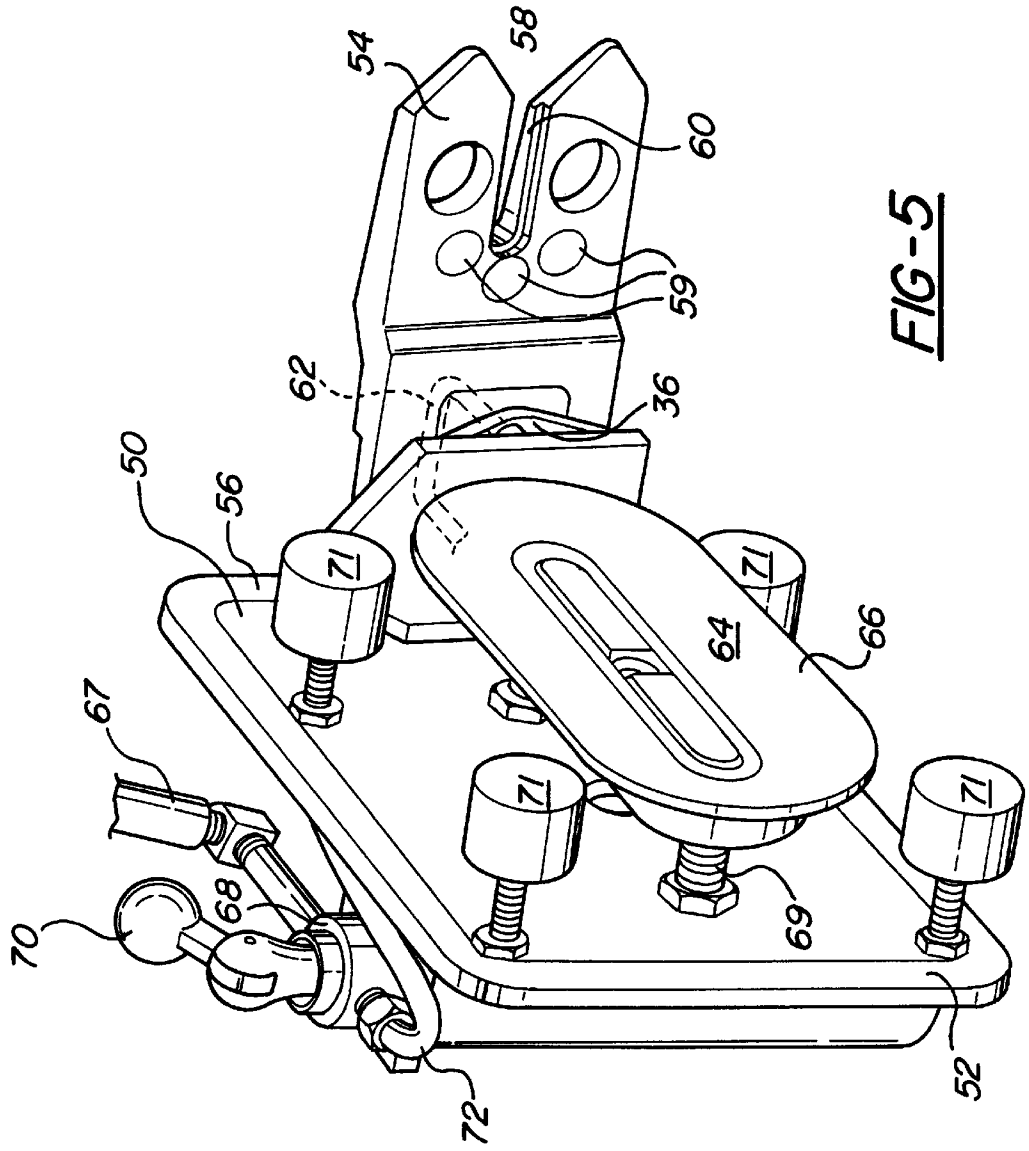
FIG. 5 is a perspective view of a tool according to the present invention, for aligning the door striker and door latch of FIGS. 2 and 3.

Referring to FIG. 5, a tool 50, according to the present invention, for aligning the striker 40 with the latch 32 is illustrated. The tool 50 improves the alignment between the striker 40 and latch 32, by initially positioning the striker 40 relative to the striker receiving portion 34 of the latch 32 so that the door 28 is flush to the vehicle body 14 in a cross-car position. It should be appreciated that for purposes of dimensional reference, the length of the motor vehicle 12 is referred to as the fore-aft position, the width of the motor vehicle 12 is the cross-car position, and the height of the motor vehicle 12 is the up-down position.

The tool 50 includes a base member 52 having a generally rectangular shape. The tool 50 also includes a striker setter 54 having a generally rectangular shape. The striker setter 54 is positioned at an end 56 of the base member 52, extending substantially perpendicular to the base member 52. One end of the striker setter 54 includes a striker lead-in portion 58 having a U-shaped 60 opening for fitting around the striker 40. The striker lead-in portion 58 positions the striker 40 in an up-down position relative to the door latch 32. Magnets 59 assist in aligning the striker lead-in portion with the striker and holding it in place.

The tool 50 includes a latch setter 62 positioned aft of the striker seller 54, for positioning the latch. Preferably the latch setter is a C-shaped steel member suitably connected to the end of the base member, and corresponding in shape to the C-shaped member 46. The tool 50 further comprises body attachment member 64, which in the preferred embodiment comprises cup 66, for holding the tool 50 onto the vehicle body 14. Preferably, the body attachment member is a rubber cup consisting of a non-abrasive material, such as polyurethane. Cup 66 is retained by pegs 69. The tool 50 further includes pegs 71 which facilitate positioning of the tool 50 against the vehicle body 14. As will be described below, cup 66 is used to draw a vacuum to hold tool 50 in place on the vehicle body 14. It should be appreciated that any suitable means of body attachment members may be used. Tool 50 further comprises vacuum regulator 74, which draws a vacuum through cup 66 which is actuated via lever 70. The tool further comprises lines 72 and 76 which provides air to regulator 74 and vacuum on cup 66, respectively. The tool is connected to a pneumatic supply (not shown) via line 67.

Figure 6:
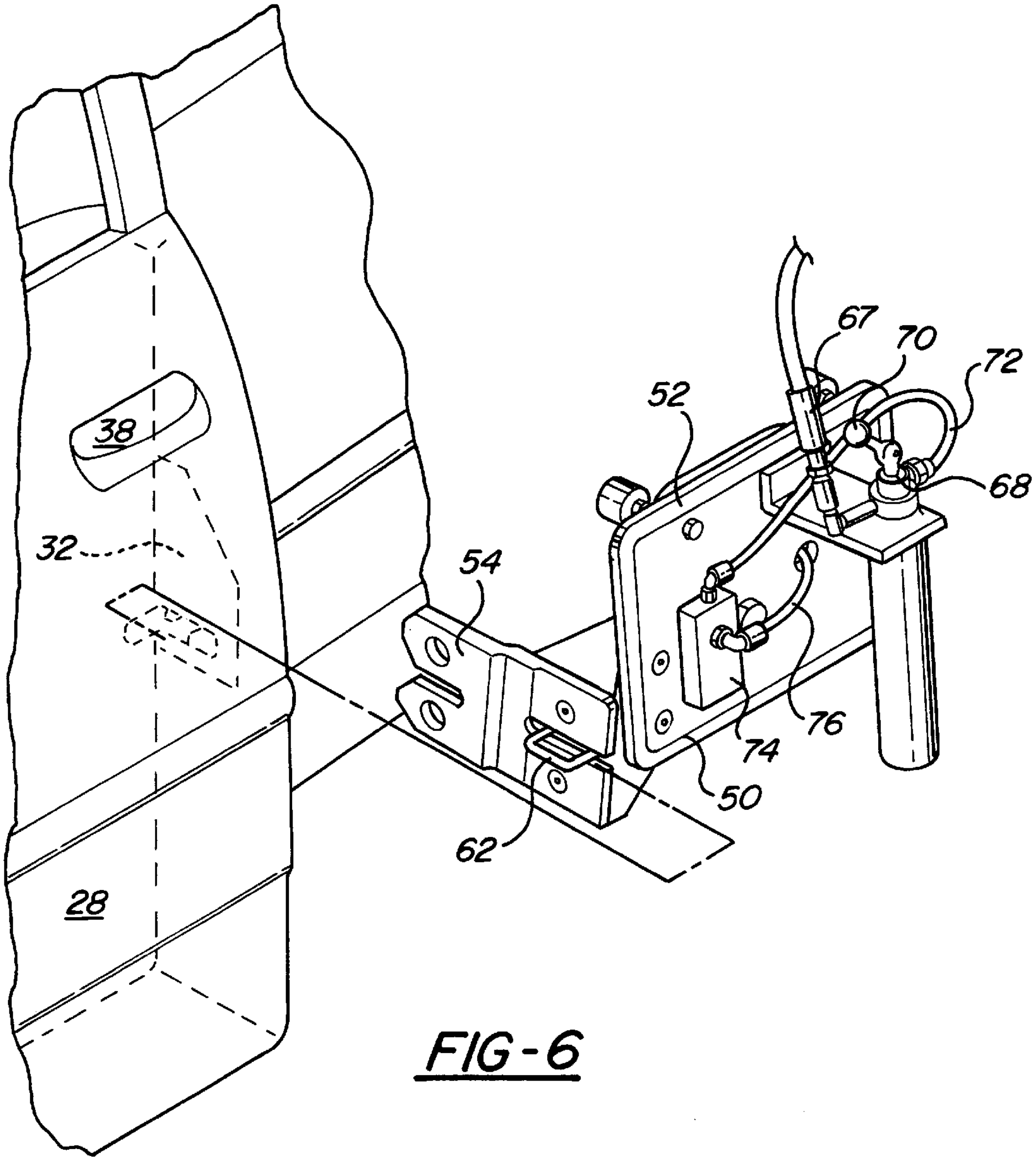
FIGS. 6–9 illustrate general steps of a method, according to the present invention, for aligning the door striker and the door latch of FIGS. 2 and 3 using the alignment tool of FIG. 5.
Figure 7:
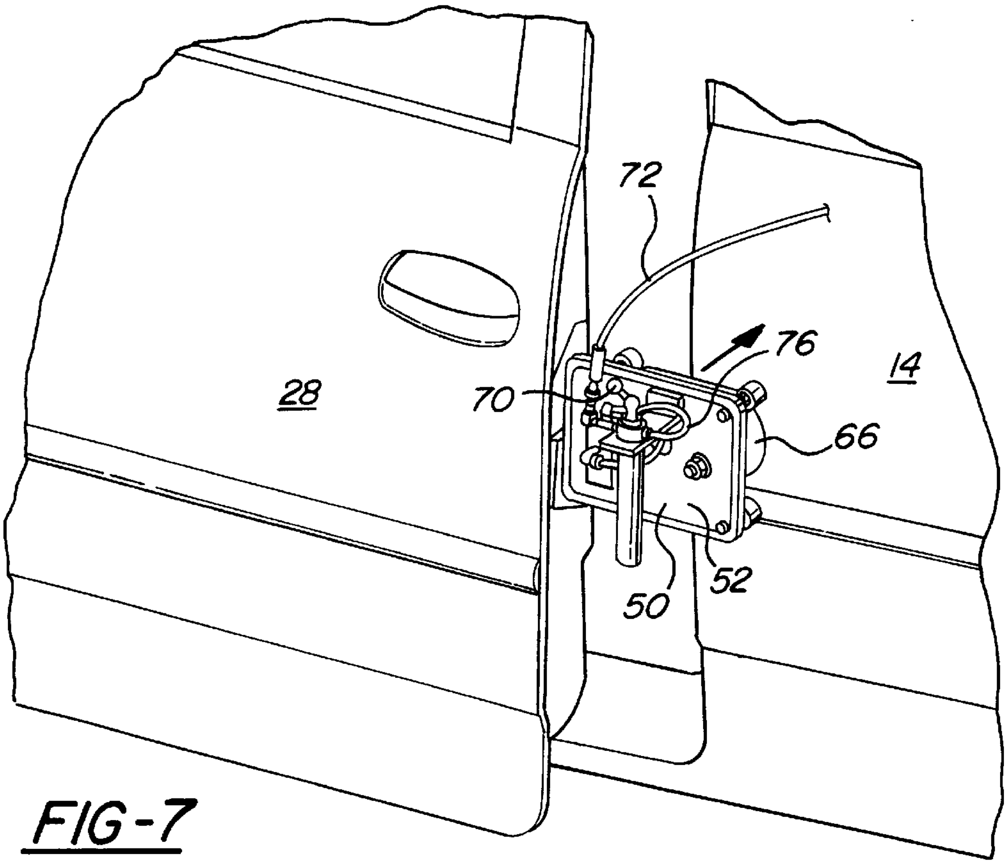

Referring to FIGS. 6–9, a method for aligning the striker and latch using the tool 50 is described. In a first step, as shown in FIGS. 6 and 7, the door 28 is in an open position. Tool 50 is placed within the striker retaining portion 34 of the latch 32 until it is engaged by latch seller 62 engaging with hooking mechanism 36, acting as would the C-shaped member 46 if the door were closed (see FIG. 3).

In a second step, as shown in FIG.7, the operator (not shown) partially closes the door 28 until the cup 66 is retained against the vehicle body 14. In this example, the cup 66 holds the tool 50 to the vehicle body 14.

Figure 8:
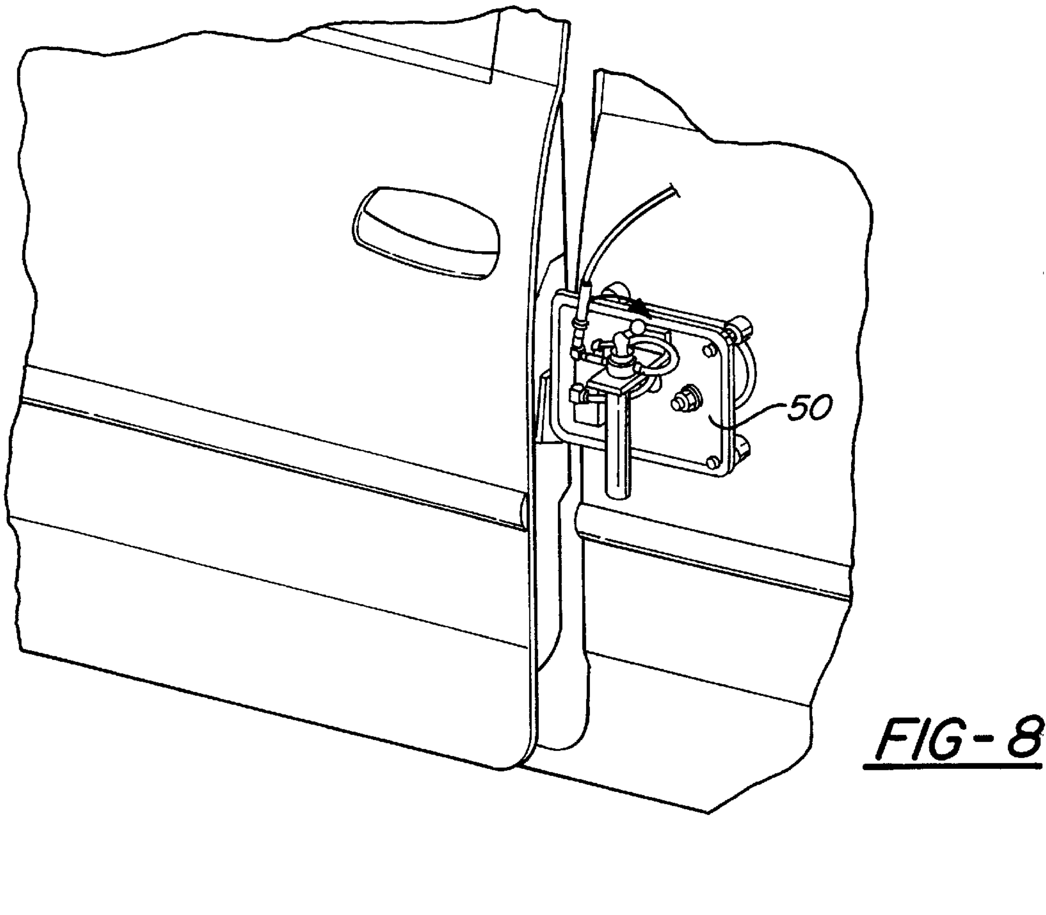

Next, as shown in FIG. 8, lever 70 is manipulated to open valve 68 to draw a vacuum in cup 66 via regulator 74. Concurrent with closing the door 28, the striker setter 54 is positioned about the striker 40. Preferably, the striker 40 is loosely held in place on the vehicle body by a fastening mechanism such as a screw. It should be appreciated that the dimensional relationships between latch and striker are determined by tool 50 such that the door 28 would be flush in a cross-car direction with the vehicle body 14, and the striker 40 would be properly aligned in the latch 32 in an up and down direction, if the door 28 was in a closed position.

Figure 9:
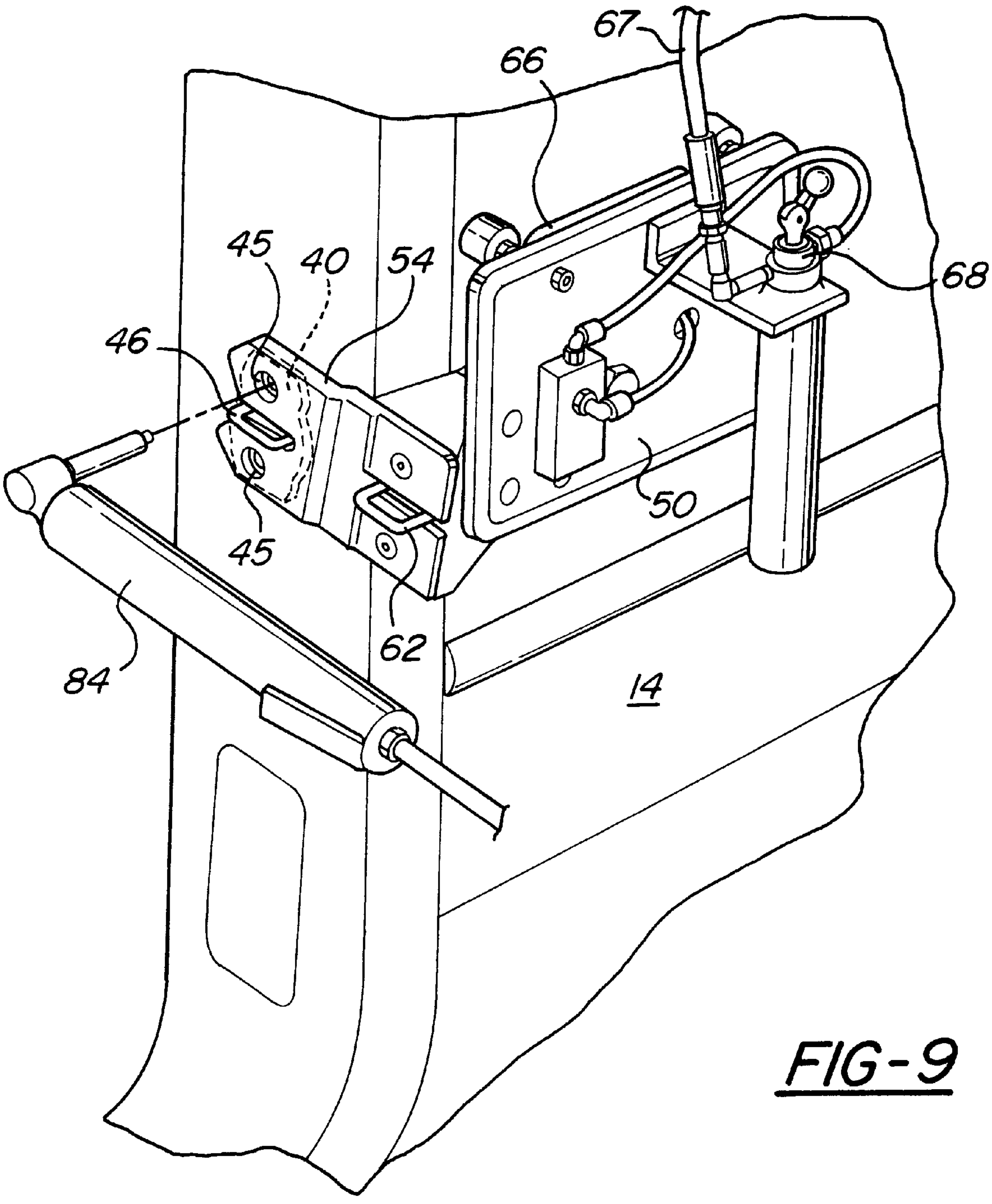

In a third step, as shown in FIG. 9, the operator moves the door handle 38 to release the hooking mechanism 36 from tool 50, and opens the door 28. It should be appreciated that, in this example, the cup 66 fixedly retains the tool 50 to the vehicle body 14. The operator then torques down the screws 45 to secure the striker 40 in the preferred alignment, such as with an air wrench 84. The operator then removes the tool 50 from the vehicle.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

We claim:

1. A tool for aligning a striker with a latch for a door on a motor vehicle comprising:

a base member;

a striker setter attached and positioned perpendicular to an end of said base member and adapted for engagement with said striker;

a securing means positioned on a front face of said base member for holding said tool onto the motor vehicle, and a latch setter extending outwardly from the end of said striker setter nearest said base member and adapted for engagement with said latch.

2. A tool as set forth in claim 1 wherein said securing means comprises a vacuum device for holding said tool on the motor vehicle.

3. A tool as set forth in claim 2 including a cup and a pneumatic supply, said cup operatively connected to said pneumatic supply.

4. A tool as set forth in claim 3 including means for controlling the pneumatic supply to said cup.

5. A tool as set forth in claim 1 further comprising pegs for positioning said tool against said vehicle.

6. A tool as set forth in claim 1 wherein said striker setter defines a U-shaped opening.

7. A tool as set forth in claim 1 wherein said latch setter comprises a C-shaped member.

8. A tool for aligning a striker with a latch for a closure panel on a motor vehicle comprising:

a base member;

a striker setting member attached and positioned perpendicular to an end of said base member, said striker setting member including a striker locating arm for positioning the striker relative to the latch, said locating arm including a U-shaped opening at one end thereof for engagement with said striker;

a securing means positioned at the front face of said base member for holding said tool onto the motor vehicle; and a latch setting arm extending outwardly from the end of said base member and adapted for engagement with said latch.

9. A tool as set forth in claim 8 wherein said securing means is a vacuum device comprising a pneumatic cup.

10. A tool as set forth in claim 9 including a valve for controlling vacuum to said pneumatic cup.

11. A method for aligning a striker with a latch on a motor vehicle comprising:

placing a latch setter of a tool into a latch of an open closure panel of the motor vehicle until the latch setter is engaged by the latch;

closing the closure panel until a striker setter of the tool about a striker loosely attached to the motor vehicle;

attaching a securing means of said tool to the motor vehicle to retain the tool against a body portion of the motor vehicle;

lifting a handle of the closure panel to disengage the tool from the latch and opening the closure panel; and securing the striker to the motor vehicle.

12. The method of claim 11 further comprising the step of disengaging the tool from the striker and the body portion of the motor vehicle.

* * * * *